United States Patent
Mouri et al.

(10) Patent No.: US 7,694,516 B2
(45) Date of Patent: Apr. 13, 2010

(54) MASTER CYLINDER, MASTER CYLINDER BODY, AND METHOD FOR PRODUCING MASTER CYLINDER

(75) Inventors: Tomonori Mouri, Kai (JP); Naganori Koshimizu, Kai (JP)

(73) Assignee: Hitachi, Ltd., Tokyo (JP)

(*) Notice: Subject to any disclaimer, the term of this patent is extended or adjusted under 35 U.S.C. 154(b) by 362 days.

(21) Appl. No.: 11/892,750

(22) Filed: Aug. 27, 2007

(65) Prior Publication Data
US 2008/0053086 A1 Mar. 6, 2008

(30) Foreign Application Priority Data
Aug. 31, 2006 (JP) ............... 2006-236932

(51) Int. Cl.
*B60T 11/16* (2006.01)
*F15B 7/08* (2006.01)

(52) U.S. Cl. ........................................ 60/588
(58) Field of Classification Search ........ 60/562, 60/585, 588, 589
See application file for complete search history.

(56) References Cited

U.S. PATENT DOCUMENTS 6,935,112 B2 * 8/2005 Koshimizu et al. ............ 60/588
7,263,830 B2 * 9/2007 Mouri et al. ................. 60/588
2006/0174619 A1 8/2006 Mouri et al.

FOREIGN PATENT DOCUMENTS

JP 2004-299568 10/2004
JP 2006-199171 8/2006

* cited by examiner

*Primary Examiner*—Thomas E Lazo
(74) *Attorney, Agent, or Firm*—Wenderoth, Lind & Ponack, L.L.P.

(57) ABSTRACT

A master cylinder that can prevent impairment of a piston seal, and a method of producing the master cylinder are provided. A master cylinder has a circumferential groove (47) in which a piston seal is provided, the piston seal having an outer circumference which enables operating fluid to be supplied, and a communication groove (96) which opens into the circumferential groove (47) and extends from the circumferential groove (47) toward a bottom portion of a cylinder body (15) to connect a pressure chamber and the circumferential groove (47). The communication groove (96) is formed with its center made eccentric relative to the center of the circumferential groove (47). A chamfered portion (100) is formed over an entire extent of a corner portion formed by the circumferential groove (47) and the communication groove (96), along a circular path concentric with the communication groove (96).

20 Claims, 4 Drawing Sheets

MASTER CYLINDER, MASTER CYLINDER BODY, AND METHOD FOR PRODUCING MASTER CYLINDER

BACKGROUND OF THE INVENTION

The present invention relates to a master cylinder for supplying operating fluid to a brake system of a vehicle, a master cylinder body, and a method of producing the master cylinder.

As a master cylinder for supplying operating fluid to a brake system of a vehicle, there is one of a structure in which a piston is directly fittingly inserted in a cylinder body of bottomed cylindrical shape, putting the sleeve for a cylinder in disuse. This type of a master cylinder comprises: a cylinder body of bottomed cylindrical shape, a supply passage provided in this cylinder body for supplying operating fluid therethrough from a reservoir; a pressure chamber defined inside the cylinder body by a piston which slides therein; a piston seal provided in a circumferential groove formed in the cylinder body, and having an inner circumference in sliding contact with the piston and an outer circumference which enables the operating fluid to be supplied from the supply passage into the pressure chamber; and a communication groove which opens into the circumferential groove and extends from this circumferential groove toward a bottom portion of the cylinder body to connect the pressure chamber side and the circumferential groove. This communication groove is formed with its center made eccentric relative to the center of the circumferential groove, and is provided to send the operating fluid, which is supplied through a portion between a bottom portion of the circumferential groove and the outer circumference of the piston seal, into the pressure chamber when the piston returns to its initial position after generating a fluid pressure in the pressure chamber. (See, for example, Japanese Patent Application Publication No. 2004-299568.)

SUMMARY OF THE INVENTION

In the above master cylinder, as a result of the structure in which the cylinder sleeve is disused and the piston is directly fittingly inserted in the cylinder body, in order to dispose the piston seal around an inner circumferential portion of the cylinder body, it is necessary, as shown in FIG. 7, that a circumferential groove 200 and a communication groove 201, which is eccentric relative to the circumferential groove 200 so as to open into the circumferential groove 200, be formed by cutting work. However, such a circumferential groove 200 and a communication groove 201, when formed, causes a corner portion 202 between them, resulting in the possibility of the piston seal impaired by the corner portion 202 between the circumferential groove 200 and the communication groove 201 during, for example, deformations or minute movements of the piston seal.

Therefore, it is an object of the present invention to provide a master cylinder that can prevent impairment of the piston seal, as well as a method of producing the master cylinder.

In order to attain the above object, the invention provides a master cylinder comprising: a cylinder body of a bottomed cylindrical shape; a supply passage provided on the cylinder body to which operating fluid is supplied from a reservoir; a pressure chamber defined inside said cylinder body by a piston which slides inside the cylinder body; a circumferential groove formed in said cylinder body; a piston seal provided in said circumferential groove, said piston seal having an inner circumference thereof in sliding contact with said piston and an outer circumference which enables the operating fluid to be supplied from said supply passage to said pressure chamber; and a communication groove which opens into said circumferential groove and extends from the circumferential groove toward a bottom portion of said cylinder body to connect said pressure chamber and said circumferential groove, said communication groove being formed with a center thereof eccentric relative to a center of said circumferential groove, wherein a chamfered portion is formed over an entire extent of a corner portion formed by said circumferential groove and said communication groove, along a circular path concentric with said communication groove.

The communication groove may be partially formed outwardly beyond a bottom portion of said circumferential groove relative to a radial direction of the cylinder body.

The chamfered portion may be formed to be enlarged in diameter from a bottom portion of said communication groove toward said circumferential groove.

The chamfered portion may be formed simultaneously when forming said communication groove.

Further, the present invention provides a master cylinder body which is formed in a bottomed cylindrical shape, and inside which a piston is slidable, said master cylinder body comprising a supply passage to which operating fluid is supplied from a reservoir; a cylinder bore in which said piston is slidably inserted and a pressure chamber is formed, the pressure chamber being defined by said piston; a circumferential groove in which a piston seal is fitted, said piston seal having an inner circumference thereof in sliding contact with said piston and an outer circumference which enables the operating fluid to be supplied only in one direction from said supply passage to said pressure chamber; and a communication groove which opens into said circumferential groove and extends from the circumferential groove toward a bottom portion of said cylinder body to connect said pressure chamber and said circumferential groove, wherein said communication groove being formed with a center thereof eccentric relative to a center of said circumferential groove, and wherein a chamfered portion is formed over an entire extent of a corner portion formed by said circumferential groove and said communication groove, along a circular path concentric with said communication groove.

The communication groove may be partially formed outwardly beyond a bottom portion of said circumferential groove relative to a radial direction of the cylinder body.

The chamfered portion may be formed to be enlarged in diameter from a bottom portion of said communication groove toward said circumferential groove.

The chamfered portion is formed simultaneously when forming said communication groove.

Further, the present invention provides a method for producing a master cylinder having a cylinder bore formed inside a cylinder body, a part of said cylinder bore constituting a pressure chamber, a circumferential groove formed in the cylinder bore to receive a piston seal therein, and a communication groove which opens into the circumferential groove and extends from the circumferential groove toward a bottom portion of said cylinder bore to connect said pressure chamber and said circumferential groove, said communication groove being formed with a center thereof eccentric relative to a center of said circumferential groove, the method comprising: after completion of cutting said circumferential groove, cutting said communication groove; and cutting a chamfered portion on a corner portion formed by said circumferential groove and said communication groove, said chamfered portion being enlarged in diameter from a bottom portion of said communication groove toward said circumferential groove.

The communication groove may be partially cut outwardly beyond a bottom portion of said circumferential groove relative to a radial direction of the cylinder body.

The chamfered portion may be formed by an entire extent of said corner portion being cut along a circular path concentric with said communication groove.

The communication groove and said chamfered portion are simultaneously cut with the same cutting tool.

BRIEF DESCRIPTION OF THE DRAWINGS

FIGS. 4A, 4B show a circumferential seal groove and a communication groove in the master cylinder according to the embodiment of the present invention, of which FIG. 4A is a cross-sectional view taken along A-A in FIG. 3, and FIG. 4B a cross-sectional view taken along B-B in FIG. 3.

DETAILED DESCRIPTION OF THE PREFERRED EMBODIMENT

An embodiment of the present invention will be described with reference to the drawings.

Figure 1:
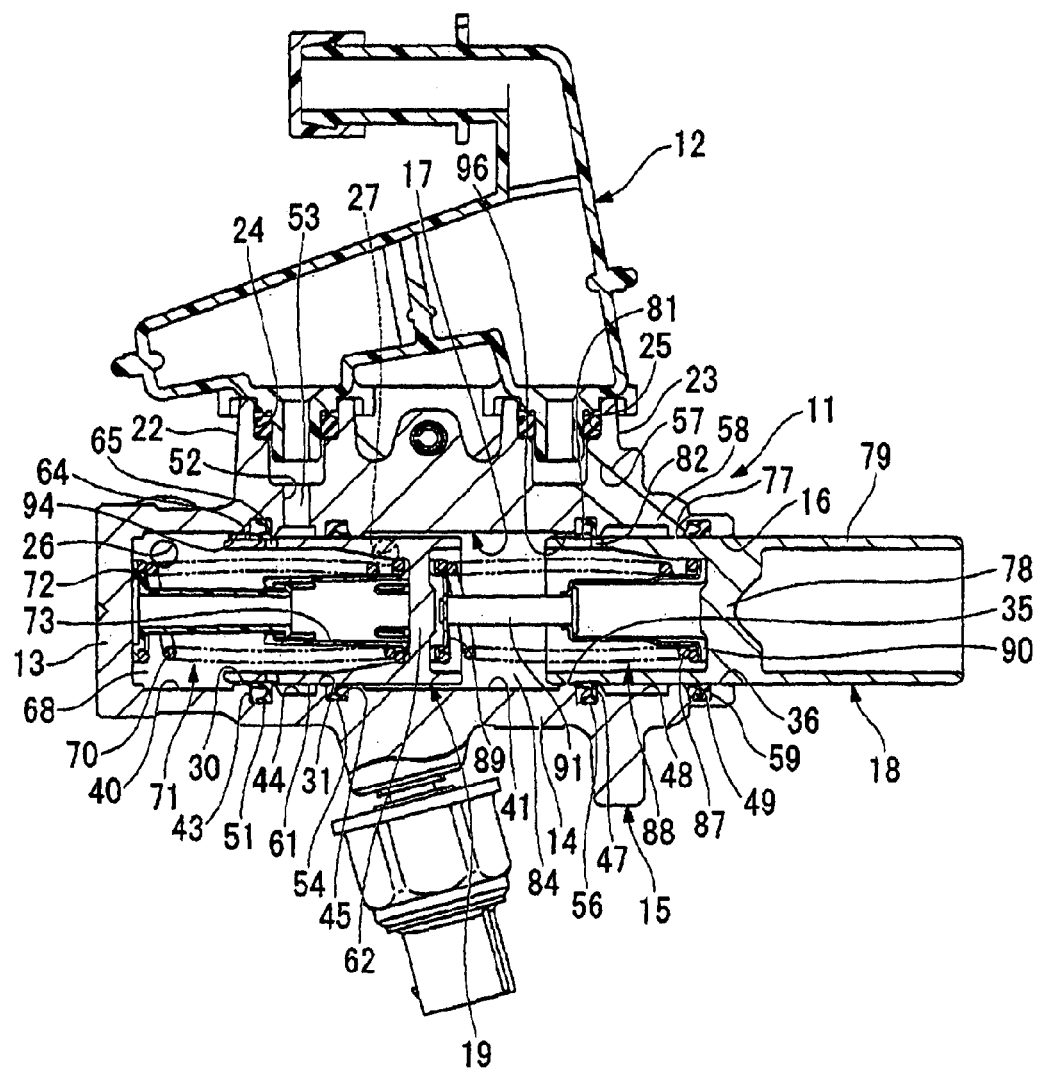
FIG. 1 is a cross-sectional view taken along a cylinder axial direction, showing a master cylinder according to an embodiment of the present invention.
Figure 2:
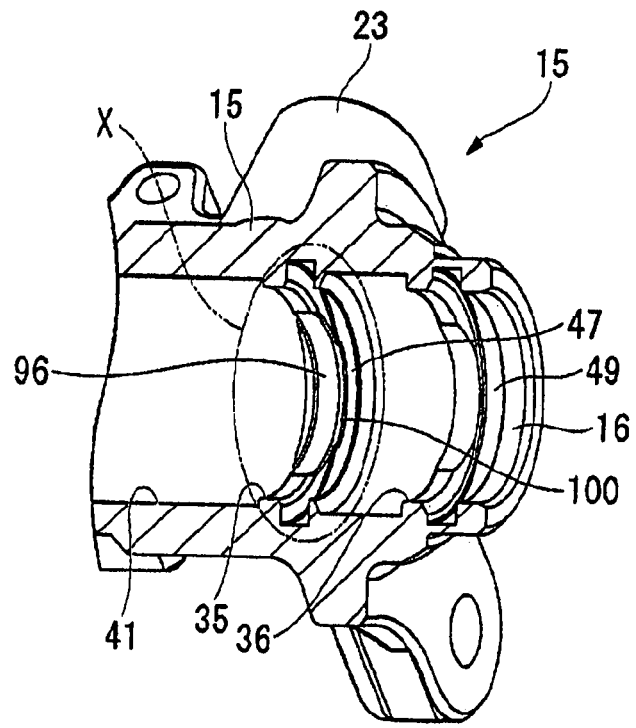
FIG. 2 is a partial cross-sectional perspective view of a cylinder body in the master cylinder according to the embodiment of the present invention.

Reference numeral 11 in FIG. 1 denotes a master cylinder of the present embodiment which generates a brake fluid pressure by the force corresponding to the operation amount of a brake pedal introduced through a brake booster (not shown). A reservoir 12 which discharges and supplies brake fluid (operating fluid) is mounted on an upper side of the master cylinder 11.

The master cylinder 11 is of a tandem type having a cylinder body 15 machined and formed from a monolithic material into a bottomed cylindrical shape having a bottom portion 13 and a cylindrical portion 14 with a cylinder bore 17 defined therein, which cylinder body is disposed in a horizontal posture on a vehicle; a primary piston (piston) 18 inserted into the cylinder body 15 and positioned at an opening 16 side in the cylinder body (right side in FIG. 1) so as to be slidable along a longitudinal axis of the cylindrical portion 14 of the cylinder body 15 (hereinafter referred to as "cylinder axis"); and a secondary piston (piston) 19 inserted into the cylinder body 15 and positioned at a portion more closed to the bottom portion 13 than the primary piston 18 (left side in FIG. 1) so as to be slidable along the direction of the cylinder axis.

The cylinder body 15 has two mount portions 22 and 23 integrally formed on the cylindrical portion 14 at a predetermined position in a circumferential direction thereof (hereinafter referred to as "cylinder circumferential direction"), which extend outwardly in a radial direction of the cylindrical portion 14 (hereinafter referred to as "cylinder radial direction"), and are juxtaposed in the direction of the cylinder axis. In the mount portions 22 and 23, mount holes 24 and 25 for mounting the reservoir 12 are formed. The position of the mount holes are coincided with each other in the cylinder circumferential direction.

A secondary discharge passage 26 and a primary discharge passage 27 which lead to the cylinder bore 17 are formed on a side of the mount portions 22 and 23 of the cylindrical portion of the cylinder body 15. The secondary discharge passage 26 and primary discharge passage 27 are secured brake lines (not shown) for supplying a brake fluid to a brake system (not shown). These secondary discharge passage 26 and primary discharge passage 27 are spaced apart from each other in the direction of the cylinder axis, while positions of the secondary discharge passage 26 and primary discharge passage 27 are coincided in the cylinder circumferential direction.

On the bottom portion 13 side of the cylindrical portion 14 forming the cylinder bore 17 of the cylinder body 15, inner diameter slide portions 30 and 31, in which the secondary piston 19 is slidably fitted, are formed in order from the bottom portion 13 side. Further, on an opening 16 side of the cylindrical portion of the cylinder body 15, inner diameter slide portions 35 and 36, in which the primary piston 18 is slidably fitted, are formed in order from the bottom portion 13 side. These inner diameter slide portions 30, 31, and 36 are coaxial and have the same diameter.

In the cylindrical portion 14 of the cylinder body 15, a large-diameter hole portion 40 which is coaxial with, but of larger diameter than, the inner diameter slide portions 30 and 31 are formed between the inner diameter slide portion 30 and the bottom portion 13. Further, between the inner diameter slide portion 31 and the inner diameter slide portion 35, a large-diameter hole portion 41 which is coaxial with, but of larger diameter than, the inner diameter slide portions 35 and 36 are formed. These large-diameter hole portions 40 and 41 have the same diameter.

On the bottom portion 13 side in the cylindrical portion 14 of the cylinder body 15, at an intermediate position of the inner diameter slide portion 30 in the direction of the cylinder axis, a circumferential seal groove (circumferential groove) 43 is formed. The circumferential seal groove is annular in the cylinder circumferential direction, and has a shape recessed outwardly in the cylinder radial direction. In the circumferential seal groove, a piston seal 51, which will be described later, is fitted. In addition, between the inner diameter slide portions 30 and 31, an open groove 44, which is annular in the cylinder circumferential direction and has a shape recessed outwardly in the cylinder radial direction, is formed. Furthermore, at an intermediate position of the inner diameter slide portion 31 in the direction of the cylinder axis, a circumferential seal groove 45 is formed which is annular in the cylinder circumferential direction and has a shape recessed outwardly in the cylinder radial direction.

Also on the opening 16 side in the cylindrical portion 14 of the cylinder body 15, at an intermediate position of the inner diameter slide portion 35 in the direction of the cylinder axis, a circumferential seal groove (circumferential groove) 47 is formed. The circumferential seal groove is annular in the cylinder circumferential direction, and has a shape recessed outwardly in the cylinder radial direction. In the circumferential seal groove, a piston seal 56, which will be described later, is fitted. In addition, between the side-permitting inner diameter portions 35 and 36, an open groove 48 is formed which is annular in the cylinder circumferential direction and has a shape recessed outwardly in the cylinder radial direction. Furthermore, at an intermediate position of the inner diameter slide portion 36 in the direction of the cylinder axis, a circumferential seal groove 49 is formed which is annular in the cylinder circumferential direction and has a shape recessed outwardly in the cylinder radial direction.

The circumferential seal groove 43 of the inner diameter slide portion 30 of the cylinder body 15 is located near the mount hole 24 on bottom portion 13 side. The piston seal 51 is fitted in the circumferential seal groove 43. The piston seal 51 is a cup seal of C-shaped cross section having lip portions at inner and outer circumferences thereof, and is mounted in the circumferential seal groove 43, with an open side thereof disposed on the bottom portion 13 side.

A communication hole 52, which is boredly formed from the mount hole 24 on the bottom portion 13 side, opens into the open groove 44 between the inner diameter slide portions 30 and 31 of the cylinder body 15. By connecting the cylinder body 15 and the reservoir 12 in a communicable manner and being always kept in communication with the reservoir 12, the open groove 44 and the communication hole 52 mainly constitute a secondary supply passage (supply passage) 53 to which the brake fluid (operating fluid) is supplied from the reservoir 12.

A partition seal 54 is fitted in the circumferential seal groove 45 on the inner diameter slide portion 31 of the cylinder body 15. This partition seal 54 is also a cup seal of C-shaped cross section having lip portions at inner and outer circumferences thereof, and is mounted in the circumferential seal groove 45, with an open side thereof disposed on the opening 16 side.

The circumferential seal groove 47 of the inner diameter slide portion 35 of the cylinder body 15 is located near the mount hole 25 on the opening 16 side. The piston seal 56 is fitted in the circumferential seal groove 47. The piston seal 56 is a cup seal of C-shaped cross section having lip portions at inner and outer circumferences thereof, and is mounted in the circumferential seal groove 47, with an open side thereof disposed on the bottom portion 13 side.

A communication hole 57, which is boredly formed from the mount hole 25 on the opening 16 side, opens into the open groove 48 between the inner diameter slide portions 35 and 36 of the cylinder body 15. By connecting the cylinder body 15 and the reservoir 12 in a communicable manner and being always kept in communication with the reservoir 12, the open groove 48 and the communication hole 57 mainly constitute a primary supply passage (supply passage) 58 to which the brake fluid is supplied from the reservoir 12.

A partition seal 59 is fitted in the circumferential seal groove 49 on the inner diameter slide portion 36 of the cylinder body 15. This partition seal 59 is also a cup seal of C-shaped cross section having lip portions at inner and outer circumferences thereof, and is mounted in the circumferential seal groove 49, with an open side thereof disposed on the bottom portion 13 side.

The secondary piston 19, which is fitted in the cylinder body 15 on the bottom portion 13 side, is of bottomed cylindrical shape having a cylindrical portion 61, and a bottom portion 62 formed inside the cylindrical portion 61, at a position close to one side in the longitudinal axis direction. The secondary piston 19 is slidably fitted in the inner diameter slide portions 30 and 31 of the cylinder body 15, with its bottom portion 62 disposed on the opening 16 side of the cylinder body 15. In addition, an annular stepped portion 64 is formed at the outer circumference of an end portion on the opposite side of the cylindrical portion 61 from the bottom portion 62. The stepped portion is of slightly smaller diameter than the remaining portion. Furthermore, on its bottom portion 62 side of the stepped portion 64 of the cylindrical portion 61, a plurality of radial ports 65 are formed. The ports extend through the stepped portion 64 in the cylinder radial direction.

A portion which is surrounded by the bottom portion 13 and the cylindrical portion 14, mainly the large-diameter hole portion 40, which define the cylinder bore 17 of the cylinder body 15, and the secondary piston 19, forms the secondary pressure chamber (pressure chamber) 68 which supplies the fluid pressure to the secondary discharge passage 26. This secondary pressure chamber 68 communicates to the secondary supply passage 53 when the secondary piston 19 is in position to allow the ports 65 to open into the open groove 44. The inner circumference of the piston seal 51 provided in the circumferential seal groove 43 on the bottom portion 13 side of the cylinder body 15 slidingly contacts the outer circumference of the secondary piston 19 and, in a state where the secondary piston 19 has the ports 65 located on a position more close to the bottom 13 than the piston seal 51, the piston seal 51 can provide a seal between the secondary supply passage 53 and the secondary pressure chamber 68, i.e., the piston seal 51 can cut off the communication between the secondary pressure chamber 68 and the secondary supply passage 53 and reservoir 12.

The piston seal 51, provided in the circumferential seal groove 43 formed in the cylinder body 15 and having the inner circumference which slidingly contact with the secondary piston 19, cuts off the communication between the secondary pressure chamber 68 and the secondary supply passage 53 and reservoir 12 when the fluid pressure in the secondary pressure chamber 68 becomes greater than that in the secondary supply passage 53 (i.e., atmospheric pressure); and provides communication between the secondary pressure chamber 68 and the secondary supply passage 53 and reservoir 12 when the fluid pressure in the secondary pressure chamber 68 becomes smaller (negative pressure) than that in the secondary supply passage 53, via a gap between the outer circumference of the outer lip portion and the circumferential seal groove 43 which is produced by deformation of the outer lip portion, thereby enabling supply of the brake fluid into the secondary pressure chamber 68.

Between the secondary piston 19 and the bottom portion 13 of the cylinder body 15, there is provided a spacing adjustment unit 71 including a secondary piston spring 70 which defines the spacing between the secondary piston 19 and the bottom portion 13 of the cylinder body 15 in the initial state where no input is applied from the not-shown brake pedal (right side in FIG. 1).

This spacing adjustment unit 71 has a spring retainer 72 which abuts with the bottom portion 13 of the cylinder body 15, a spring retainer 73 which abuts with the bottom portion 62 of the secondary piston 19 and coupled to the spring retainer 72 so that the spring retainer 73 is slidable only within predetermined limits. The secondary piston spring 70 is interposed between the spring retainers 72 and 73 on both sides.

The primary piston 18, which is fitted in the cylinder body 15 on the opening 16 side, is shaped to have a first cylindrical portion 77, a bottom portion 78 formed on one side in the longitudinal axis direction of the first cylindrical portion 77, and a second cylindrical portion 79 formed on the opposite side of the bottom portion 78 from the first cylindrical portion 77; and is slidably fitted in the inner diameter slide portions 35 and 36 of the cylinder body 15, with its first cylindrical portion 77 disposed on the secondary piston 19 side in the cylinder body 15. A not-shown brake booster output shaft is inserted into the secondary cylindrical portion 79, and this output shaft pushes the bottom portion 78.

An annular recessed portion 81 is formed at the outer circumference of an end portion on the opposite side of the first cylindrical portion 77 from the bottom portion 78. The recessed portion is of slightly smaller diameter than the remaining portion. Furthermore, on its bottom portion 78 side, the recessed portion 81 of the first cylindrical portion 77 is provided with a plurality of radial ports 82 which extend through the first cylindrical portion in the radial direction.

A portion which is surrounded by the cylindrical portion 14, mainly the large-diameter hole portion 41, which defines the cylinder bore 17 of the cylinder body 15, the primary piston 18, and the secondary piston 19, forms a primary pressure chamber (pressure chamber) 84 which supplies the fluid pressure to the primary discharge passage 27. This primary pressure chamber 84 communicates to the primary supply passage 58 when the primary piston 18 is in position to allow the ports 82 to open into the open groove 48. The inner circumference of the piston seal 56 provided in the circumferential seal groove 47 of the cylinder body 15 slidingly contacts the outer circumference of the primary piston 18 and, in a state where the primary piston 18 has the ports 82 located on position more close to the bottom 13 than the piston seal 56, the piston seal 56 can provide a seal between the primary supply passage 58 and the primary pressure, chamber 84, i.e., can cut off the communication between the primary pressure chamber 84 and the primary supply passage 58 and reservoir 12.

The piston seal 56, provided in the circumferential seal groove 47 formed in the cylinder body 15 and having the inner circumference which slidingly contact with the primary piston 18, cuts off the communication between the primary pressure chamber 84 and the primary supply passage 58 and reservoir 12 when the fluid pressure in the primary pressure chamber 84 becomes greater than that in the primary supply passage 58 (i.e., atmospheric pressure); and provides communication between the primary pressure chamber 84 and the primary supply passage 58 and reservoir 12 when the fluid pressure in the primary pressure chamber 84 becomes smaller (negative pressure) than that in the primary supply passage 58, via a gap between the outer circumference of the outer lip portion and the circumferential seal groove 47 which is produced by deformation of the outer lip portion, thereby enabling supply of the brake fluid into the primary pressure chamber 84.

The partition seal 54 provided in the circumferential seal groove 45 slidingly contacts the secondary piston 19 so as to seal between the secondary pressure chamber 68 and secondary supply passage 53 and the primary pressure chamber 84, and the partition seal 59 provided in the circumferential seal groove 49 slidingly contacts the primary piston 18 so as to seal the primary supply passage 58 and the primary pressure chamber 84 against the external air.

Between the secondary piston 19 and the primary piston 18, there is provided a spacing adjustment unit 88 including a primary piston spring 87 which defines the spacing between the secondary piston 19 and the primary piston 18 in the initial state where no input is applied from the not-shown brake pedal (right side in FIG. 1).

This spacing adjustment unit 88 has a spring retainer 89 which abuts with the bottom portion 62 of the secondary piston 19, a spring retainer 90 which abuts with the bottom portion 78 of the primary piston 18, and a shaft member 91 fixed at one end portion to the spring retainer 89 and supporting the spring retainer 90 in a slidable manner within predetermined limits. The primary piston spring 87 is interposed between the spring retainers 89 and 90 on both sides.

At a portion of the inner diameter slide portion 30 of the cylinder body 15 on a side more close to a large-diameter hole portion 40 than the circumferential seal groove 43, a communication groove 94 is formed which is recessed outwardly in the cylinder radial direction. The communication groove 94 opens, at one end thereof in the direction of the cylinder axis, into the circumferential seal groove 43, and extends toward the bottom portion 13 of the cylinder bore 17, and opens, at the other end, into the large-diameter hole portion 40. This communication groove 94 provides communication between the secondary discharge passage 26 formed in the large-diameter hole portion 40 and the circumferential seal groove 43 via the secondary pressure chamber 68. This communication groove 94 is formed in an arc shape of smaller diameter than the inner diameter slide portion 30 and having a center eccentric relative to the center of the circumferential seal groove 43. Owing to the presence of this communication groove 94, the brake fluid can efficiently be supplied from the secondary supply passage 53 to the secondary pressure chamber 68 when a negative pressure is produced in the above secondary pressure chamber 68.

Likewise, at a portion of the inner diameter slide portion 35 of the cylinder body 15 on a side more close to a large-diameter hole portion 41 than the circumferential seal groove 47, a communication groove 96 is formed which is recessed outwardly in the cylinder radial direction. The communication groove 96 opens, at one end thereof in the direction of the cylinder axis, into the circumferential seal groove 47, and extends toward the bottom portion 13 of the cylinder bore 17, and opens, at the other end, into the large-diameter hole portion 41. This communication groove 96 provides communication between the primary discharge passage 27 formed in the large-diameter hole portion 41 and the circumferential seal groove 47 via the primary pressure chamber 84. This communication groove 96 is also formed in an arc shape of smaller diameter than the inner diameter slide portion 35 and having a center eccentric relative to the center of the circumferential seal groove 47. Owing to the presence of this communication groove 96, the brake fluid can efficiently be supplied from the primary supply passage 58 to the primary pressure chamber 84 when a negative pressure is produced in the above primary pressure chamber 84.

Moreover, in the present embodiment, as exemplified in FIGS. 2 to 5 in connection with the communication groove 96 on the primary pressure chamber 84 side of the cylinder body 15, chamfered portions 100 are formed over an entire extent of a corner portion formed by the circumferential seal groove 47 and the communication groove 96, and over an entire extent of a corner portion formed by the circumferential seal groove 43 and the communication groove 94. As shown, this chamfered portion 100 is formed along a circular path that is concentric with the communication groove 96, and machined simultaneously with the communication groove 96. The primary side is described by way of example in the following description for the reason of illustration, but the same also applies to the secondary side. In FIGS. 2, 3, 5 and 7, the piston seal 56 provided in the circumferential seal groove 47 is omitted, for the reason of illustration.

Figure 6:
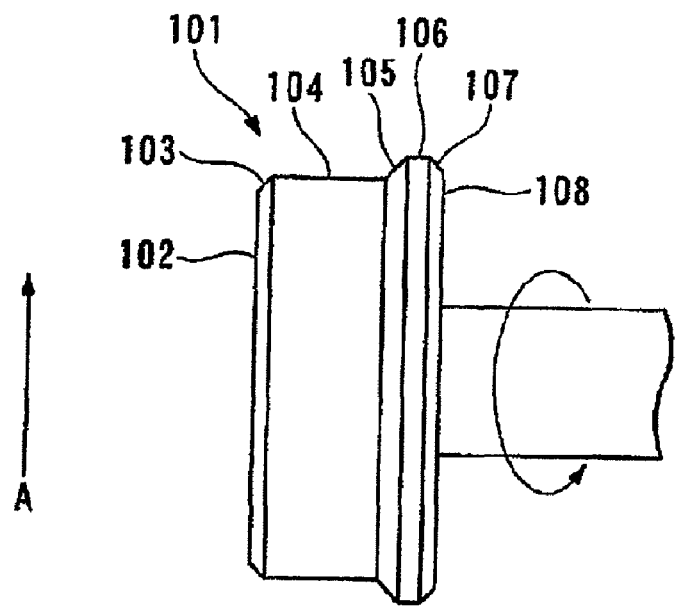
FIG. 6 is a side view of a tool for machining the communication groove in the cylinder body in the master cylinder according to the embodiment of the present invention.
Figure 7:
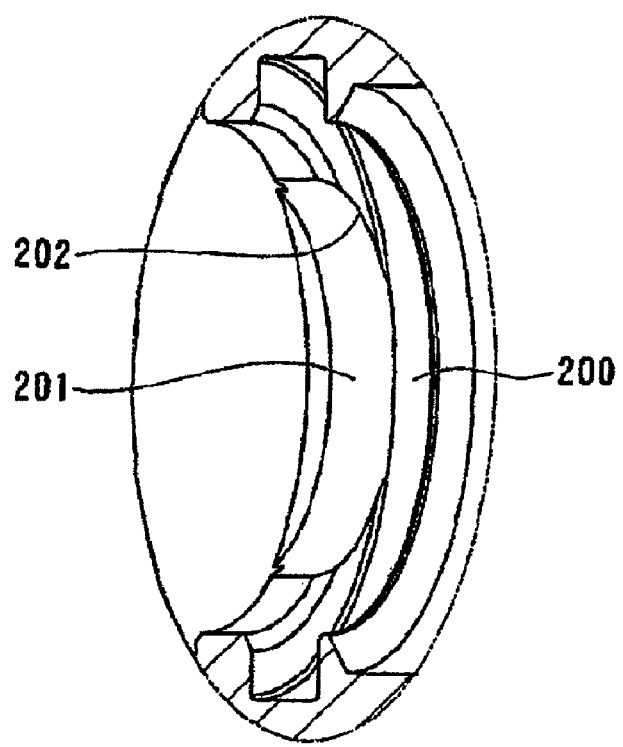
FIG. 7 is a partial enlarged perspective view of a circumferential seal groove, a communication groove and their vicinity of a cylinder body of a background art master cylinder.

A T-slot cutter (tool) 101 for simultaneously machining the communication groove 96 and chamfered portion 100, as shown in FIG. 6, has: a first end face 102 located at one end in the direction of the axis of the tool and extending along a direction perpendicular to the axis; a first cutting portion 103 having a tapered cutting face which extends so as to increase in diameter as it proceeds in the longitudinal axis direction away from an outer edge portion of the first end face 102; a second cutting portion 104 which extends, with a cutting face having a constant outer diameter, in the longitudinal axis direction from the outer edge portion of the first cutting portion 103 on the side opposite from the first end face 102; a third cutting portion 105 provided on the opposite side of the second cutting portion 104 from the first cutting portion 103 and having a tapered cutting face which increases in diameter as it proceeds in the longitudinal axis direction away from the second cutting portion 104; a fourth cutting portion 106 with a cutting face having a constant outer diameter which extends from the outer edge portion of the third cutting portion 105 in an opposite direction to the direction in which the second cutting portion 104 extends; a fifth cutting portion 107 provided on the opposite side of the fourth cutting portion 106 from the third cutting portion 105 and having a tapered cutting face which decreases in diameter as it proceeds in the longitudinal axis direction away from the fourth cutting portion 106; and a second end face 108 located on the opposite side of the fifth cutting portion 107 from the fourth cutting portion 106 and extending along a direction perpendicular to the axis. The minimum diameter of the cutting face of the fifth cutting portion 107 is greater than the minimum diameter of the cutting face of the third cutting portion 105, i.e., than the outer diameter of the cutting face of the second cutting portion 104.

Figure 3:
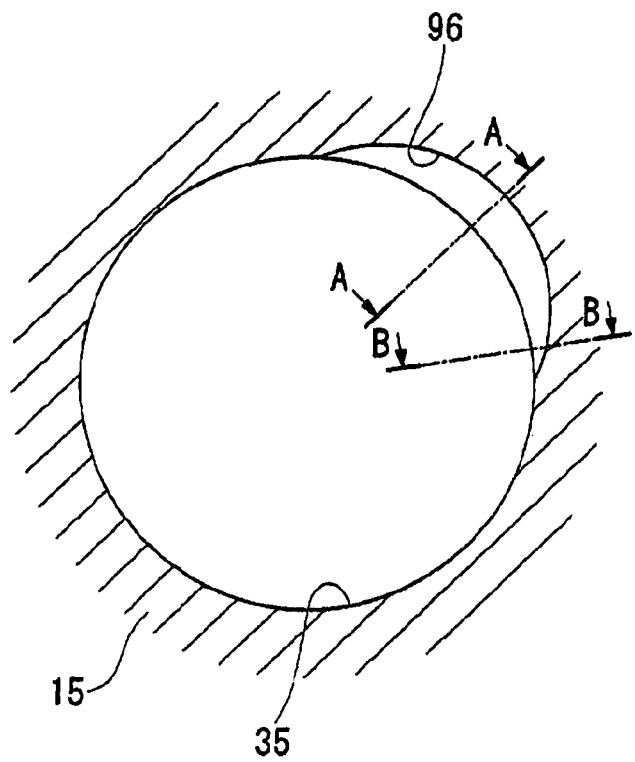
FIG. 3 is a cross-sectional view of the cylinder body, taken perpendicular to the cylinder axial direction, in the master cylinder according to the embodiment of the present invention.

FIGS. 4A, 4B show a circumferential seal groove and a communication groove in the master cylinder, of which FIG. 4A is a cross-sectional view taken along A-A in FIG. 3, and FIG. 4B a cross-sectional view taken along B-B in FIG. 3.

After completion of cutting a circumferential seal groove 47 of substantially constant circular cross section with another not-shown cutting tool which is inserted through the opening 16 into the cylinder body 15, the above T-slot cutter 101, which is also inserted through the opening 16, is used, with its center being off-centered in the direction A (FIG. 6) towards the outer circumference of the cylinder body 15 relative to the center of the circumferential seal groove 47, to cut the communication groove 96 on the bottom portion 13 side of the circumferential seal groove 47. In this instance, the second cutting portion 104 is fed in the direction A outwardly beyond the bottom portion of the circumferential groove in the cylinder radial direction, with an intermediate position in the longitudinal axis direction of the third cutting portion 105 aligned, in the cylinder longitudinal axis direction, with the position of a wall portion 110 of the circumferential seal groove 47 on the cylinder bottom portion 13 side. Thereupon, a portion more close to the cylinder bottom portion 13 of the inner diameter slide portion 35 than the circumferential seal groove 47 is cut out in the cylinder longitudinal axis direction by the T-slot cutter 101.

Figure 4:
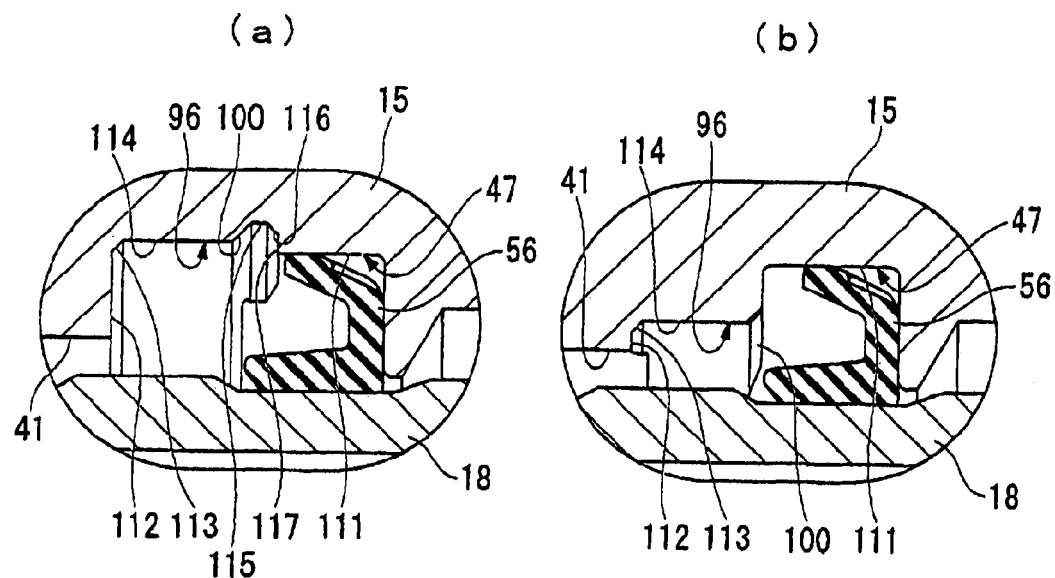
Figure 5:
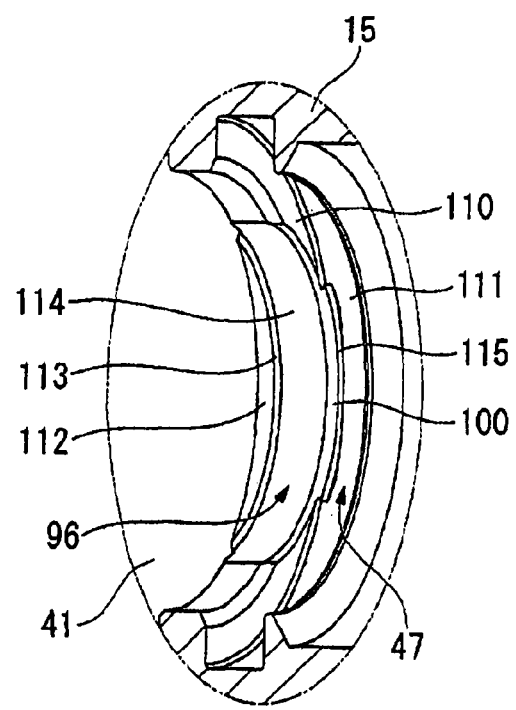
FIG. 5 is an enlarged perspective view of the area X in FIG. 2 of the cylinder body in the master cylinder according to the embodiment of the present invention.

In this instance, a wall portion 112 shown in FIGS. 4 and 5, which is at the boundary between the large-diameter hole portion 41 and the communication groove 96 and extends along a direction perpendicular to the cylinder axis, is formed by the first cutting portion 103, along with a tapered bottom chamfered portion 113 which increases in diameter as it proceeds in the longitudinal axis direction away from the wall portion 112; and a bottom portion 114 of the communication groove 96 which lies along the cylinder longitudinal axis is formed by the second cutting portion 104. In addition, a chamfered portion 100 is formed, by the third cutting portion 105, over a portion from a corner portion between the bottom portion 114 of the communication groove 96 and the wall portion 110 of the circumferential seal groove 47 to a corner portion between the bottom portion 114 of the communication groove 96 and the bottom portion 111 of the circumferential seal groove 47 as shown in FIG. 5 (i.e., over an entire extent of the corner portion formed by the circumferential seal groove 47 and the communication groove 96), along a circular path concentric with the communication groove 96. This chamfered portion 100 has a shape enlarged in diameter as it proceeds from the bottom portion 114 of the communication groove 96 toward the circumferential seal groove 47. Furthermore, a bottom portion 115 which is at a greater depth than the bottom portion 111 of the circumferential seal groove 47 and along the direction of the cylinder axis is formed in the circumferential seal groove bottom portion 111 by the fourth cutting portion 106, and a tapered portion 116 as shown in FIG. 4A which decreases in diameter as it proceeds away from the communication groove 96 is formed in the bottom portion 111 of the circumferential seal groove 47 by the fifth cutting portion 107, along with a wall portion 117 which is at the boundary between the tapered portion 116 and the bottom portion 111 of the circumferential seal groove 47 and along a direction perpendicular to the cylinder axis.

As mentioned above, by feeding the third cutting portion 104 of the T-slot cutter 101 outwardly beyond the bottom portion 111 of the circumferential seal groove 47 relative to the cylinder radial direction, the communication groove 96 is partially formed deeper outwardly beyond the bottom portion 111 of the circumferential seal groove 47 relative to the cylinder radial direction.

According to the present embodiment as described above, after completion of cutting the circumferential seal groove 47, the communication groove 96 is cut, and the chamfered portion 100 is cut on the corner portion formed by the circumferential seal groove 47 and the communication groove 96. Since this chamfered portion 100 is formed over an entire extent of the corner portion formed by the circumferential seal groove 47 and the communication groove 96, the piston seal 56 is not impaired on the corner portion between the circumferential seal groove 47 and the communication groove 96 if it experiences deformations, minute displacements, or the like. Impairment of the piston seal 56 is thus prevented.

In addition, since the chamfered portion 100 is formed over the entire extent of the corner portion formed by the circumferential seal groove 47 and the communication groove 96, along a circular path concentric with the communication groove 96, the communication groove 96 and the chamfered portion 100 can be cut at a time with the same T-slot cutter 100. Therefore, an easy machining can be obtained as compared with the case where the corner portion, which is eccentric relative to the circumferential seal groove 47 and thus intricate in shape and difficult to machine, is cut anew with another tool, thereby improving the productivity.

Furthermore, since the communication groove 96 is partially formed by cutting work outwardly beyond the bottom portion 111 of the circumferential seal groove 47 relative to the cylinder radial direction, the fluid can be supplied satisfactorily through the gap between the outer circumference of the piston seal 56 and the bottom portion 111 of the circumferential seal groove 47, and through the communication groove 96.

Additionally, since the chamfered portion 100 is formed to be enlarged in diameter as it proceeds from the bottom portion 114 of the communication groove 96 toward the circumferential seal groove 47, the fluid can be supplied further satisfactorily through the gap between the outer circumference of the piston seal 56 and the bottom portion 111 of the circumferential seal groove 47, and through the communication groove 96.

The above effects are also applicable to the secondary side where the same construction as described above is employed.

According to the master cylinder of the invention, since a chamfered portion is formed over an entire extent of the corner portion formed by the circumferential groove which receives the piston seal therein and the communication groove which opens into the circumferential groove, the piston seal is not impaired by the corner portion between the circumferential groove and the communication groove if it undergoes deformations, minute movements, or the like. Therefore, impairment of the piston seal can be prevented.

Further, since the communication groove is partially formed outwardly beyond the bottom portion of the circumferential groove relative to the cylinder radial direction, the fluid can be supplied satisfactorily through a gap between the outer circumference of the piston seal and the bottom portion of the circumferential groove, and through the communication groove.

Further, since the chamfered portion is formed to be enlarged in diameter from the bottom portion of the communication groove toward the circumferential groove, the fluid can be supplied further satisfactorily through the gap between the outer circumference of the piston seal and the bottom portion of the circumferential groove, and through the communication groove.

Further, since the chamfered portion is formed simultaneously when forming the communication groove, its machining can be done easily as compared with the case where the corner portion, which is eccentric relative to the circumferential groove and thus difficult to machine, is cut anew with another tool to form the chamfered portion, resulting in an improved productivity.

According to the master cylinder body of the invention, since a chamfered portion is formed over an entire extent of the corner portion formed by the circumferential groove which receives the piston seal therein and the communication groove which opens into the circumferential groove, the piston seal is not impaired by the corner portion between the circumferential groove and the communication groove if it undergoes deformations, minute movements, or the like. Therefore, impairment of the piston seal can be prevented.

Further, since the communication groove is partially formed outwardly beyond the bottom portion of the circumferential groove relative to the cylinder radial direction, the fluid can be supplied satisfactorily through a gap between the outer circumference of the piston seal and the bottom portion of the circumferential groove, and through the communication groove.

Further, since the chamfered portion is formed to be enlarged in diameter from the bottom portion of the communication groove toward the circumferential groove, the fluid can be supplied further satisfactorily through the gap between the outer circumference of the piston seal and the bottom portion of the circumferential groove, and through the communication groove.

Further, since the chamfered portion is formed simultaneously when forming the communication groove, its machining can be done easily as compared with the case where the corner portion, which is eccentric relative to the circumferential groove and thus difficult to machine, is cut anew with another tool to form the chamfered portion, resulting in an improved productivity.

According to the method for producing the master cylinder, since, after cutting the circumferential groove, the communication groove is cut, and a chamfered portion is cut on the corner portion formed by the circumferential groove and the communication groove, which chamfered portion is enlarged in diameter from the bottom portion of the communication groove toward the circumferential groove, the piston seal is not impaired by the corner portion between the circumferential groove and the communication groove if it undergoes deformations, minute movements or the like. Therefore, impairment of the piston seal can be prevented. In addition, since the chamfered portion is formed to be enlarged in diameter as it proceeds from the bottom portion of the communication groove to the circumferential groove side, the fluid can be supplied satisfactorily through a gap between the outer circumference of the piston seal and a bottom portion of the circumferential groove, and through the communication groove.

Further, since the communication groove is partially cut outwardly beyond the bottom portion of the circumferential groove relative to the cylinder radial direction, the fluid can be supplied further satisfactorily through the gap between the outer circumference of the piston seal and the bottom portion of the circumferential groove, and through the communication groove.

Further, since an entire extent of the corner portion formed by the circumferential groove and the communication groove is cut along a circular path which is concentric with the communication groove so as to form the chamfered portion, it becomes possible to cut the communication groove and the chamfered portion at a time with the same tool. Therefore, an easy machining becomes possible as compared with the case where the corner portion, which is eccentric relative to the circumferential groove and thus intricate in shape and difficult to machine, is cut anew with another tool, resulting in an improved productivity.

Further, since the communication groove and the chamfered portion are simultaneously cut with the same cutting tool, an easy machining can be done as compared with the case where the corner portion, which is eccentric relative to the circumferential groove and thus intricate in shape and difficult to machine, is cut anew with another tool, resulting in an improved productivity.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority under 35 U.S.C. section 119 to Japanese Patent Application No. 2006-23693, filed on Aug. 31, 2006. The entire disclosure of Japanese Patent Application No. 2006-236932 filed on Aug. 31, 2006 including specification, claims, drawings and summary is incorporated herein by reference in its entirety.

The Japanese Patent Public Disclosure No. 2004-299568 is incorporated herein by reference in its entirety.

What is claimed is:

1. A master cylinder comprising: a cylinder body of a bottomed cylindrical shape; a supply passage provided on the cylinder body to which operating fluid is supplied from a reservoir; a pressure chamber defined inside said cylinder body by a piston which slides inside the cylinder body; a circumferential groove formed in said cylinder body; a piston seal provided in said circumferential groove, said piston seal having an inner circumference thereof in sliding contact with said piston and an outer circumference which enables the operating fluid to be supplied from said supply passage to said pressure chamber; and a communication groove which opens into said circumferential groove and extends from the circumferential groove toward a bottom portion of said cylinder body to connect said pressure chamber and said circumferential groove, said communication groove being formed with a center thereof eccentric relative to a center of said circumferential groove, wherein a chamfered portion is formed over an entire extent of a corner portion formed by said circumferential groove and said communication groove, along a circular path concentric with said communication groove.

2. The master cylinder according to claim 1, wherein said communication groove is partially formed outwardly beyond a bottom portion of said circumferential groove relative to a radial direction of the cylinder body.

3. The master cylinder according to claim 2, wherein said chamfered portion is formed to be enlarged in diameter from a bottom portion of said communication groove toward said circumferential groove.

4. The master cylinder according to claim 2, wherein said chamfered portion is formed simultaneously when forming said communication groove.

5. The master cylinder according to claim 1, wherein said chamfered portion is formed to be enlarged in diameter from a bottom portion of said communication groove toward said circumferential groove.

6. The master cylinder according to claim 5, wherein said chamfered portion is formed simultaneously when forming said communication groove.

7. The master cylinder according to claim 1, wherein said chamfered portion is formed simultaneously when forming said communication groove.

8. A master cylinder body which is formed in a bottomed cylindrical shape, and inside which a piston is slidable, said master cylinder body comprising a supply passage to which operating fluid is supplied from a reservoir; a cylinder bore in which said piston is slidably inserted and a pressure chamber is formed, the pressure chamber being defined by said piston; a circumferential groove in which a piston seal is fitted, said piston seal having an inner circumference thereof in sliding contact with said piston and an outer circumference which enables the operating fluid to be supplied only in one direction from said supply passage to said pressure chamber; and a communication groove which opens into said circumferential groove and extends from the circumferential groove toward a bottom portion of said cylinder body to connect said pressure chamber and said circumferential groove, wherein said communication groove being formed with a center thereof eccentric relative to a center of said circumferential groove, and wherein a chamfered portion is formed over an entire extent of a corner portion formed by said circumferential groove and said communication groove, along a circular path concentric with said communication groove.

9. The master cylinder body according to claim 8, wherein said communication groove is partially formed outwardly beyond a bottom portion of said circumferential groove relative to a radial direction of the cylinder body.

10. The master cylinder body according to claim 9, characterized in that said chamfered portion is formed to be enlarged in diameter from a bottom portion of said communication groove toward said circumferential groove.

11. The master cylinder body according to claim 9, wherein said chamfered portion is formed simultaneously when forming said communication groove.

12. The master cylinder body according to claim 8, wherein said chamfered portion is formed to be enlarged in diameter from a bottom portion of said communication groove toward said circumferential groove.

13. The master cylinder body according to claim 8, wherein said chamfered portion is formed simultaneously when forming said communication groove.

14. A method for producing a master cylinder having a cylinder bore formed inside a cylinder body, a part of said cylinder bore constituting a pressure chamber, a circumferential groove formed in the cylinder bore to receive a piston seal therein, and a communication groove which opens into the circumferential groove and extends from the circumferential groove toward a bottom portion of said cylinder bore to connect said pressure chamber and said circumferential groove, said communication groove being formed with a center thereof eccentric relative to a center of said circumferential groove, the method comprising:

after completion of cutting said circumferential groove, cutting said communication groove; and cutting a chamfered portion on a corner portion formed by said circumferential groove and said communication groove, said chamfered portion being enlarged in diameter from a bottom portion of said communication groove toward said circumferential groove.

15. The method for producing a master cylinder according to claim 14, wherein said communication groove is partially cut outwardly beyond a bottom portion of said circumferential groove relative to a radial direction of the cylinder body.

16. The method for producing a master cylinder according to claim 15, wherein said chamfered portion is formed by an entire extent of said corner portion being cut along a circular path concentric with said communication groove.

17. The method for producing a master cylinder according to claim 15, wherein said communication groove and said chamfered portion are simultaneously cut with the same cutting tool.

18. The method for producing a master cylinder according to claim 14, wherein said chamfered portion is formed by an entire extent of said corner portion being cut along a circular path concentric with said communication groove.

19. The method for producing a master cylinder according to claim 18, wherein said communication groove and said chamfered portion are simultaneously cut with the same cutting tool.

20. The method for producing a master cylinder according to claim 14, wherein said communication groove and said chamfered portion are simultaneously cut with the same cutting tool.

* * * * *